United States Patent
Battershell et al.

(10) Patent No.: US 6,767,390 B2
(45) Date of Patent: Jul. 27, 2004

(54) ENERGY EFFICIENT DESICCANT DRYER REGENERATION SYSTEM

(75) Inventors: John R. Battershell, Hamburg, NY (US); Charles Impastato, Marilla, NY (US); Alfredo R. Longo, Buffalo, NY (US)

(73) Assignee: Cooper Turbocompressor, Inc., Houston, TX (US)

(*) Notice: Subject to any disclaimer, the term of this patent is extended or adjusted under 35 U.S.C. 154(b) by 106 days.

(21) Appl. No.: 10/178,989

(22) Filed: Jun. 25, 2002

(65) Prior Publication Data

US 2003/0233941 A1 Dec. 25, 2003

(51) Int. Cl.[7] .......................... B01D 53/04; B01D 53/26
(52) U.S. Cl. ........................ 96/111; 95/10; 95/11; 95/15; 95/117; 95/125; 96/112; 96/114; 96/115; 96/130; 96/143
(58) Field of Search ........................... 95/10, 11, 14, 95/15, 17–19, 21, 117–126; 96/111–114, 130, 115, 143–146

(56) References Cited

U.S. PATENT DOCUMENTS

| | | | | |
|---|---|---|---|---|
| 1,892,428 A | * | 12/1932 | Fonda ........................... | 95/11 |
| 4,504,286 A | * | 3/1985 | Carlisle et al. ................. | 95/10 |
| 4,941,894 A | * | 7/1990 | Black ............................. | 95/14 |
| 5,632,802 A | * | 5/1997 | Grgich et al. .................. | 95/10 |
| 6,077,330 A | * | 6/2000 | Sabelstrom .................... | 95/11 |
| 6,171,377 B1 | * | 1/2001 | Henderson .................... | 96/122 |
| 6,221,130 B1 | | 4/2001 | Kolodziej et al. ............. | 95/41 |
| 6,375,722 B1 | | 4/2002 | Henderson et al. ........... | 96/112 |
| 2002/0134234 A1 | * | 9/2002 | Kalbassi et al. ............... | 95/11 |

* cited by examiner

Primary Examiner—Robert H. Spitzer
(74) Attorney, Agent, or Firm—Michael P. Hartmann; Peter A. Bielinski

(57) ABSTRACT

A method to control the performance of desiccant dryers is disclosed that senses multiple variables and optimizes the regeneration cycle to deliver the gas at the desired dew point. The length of the stripping step is reduced or eliminated depending on the desired set point and the operating conditions of the compression system. The control system has the capability to switch to high efficiency mode of operation should the dew point set point be changed. The savings come from not purging as much or any gas during stripping should the system requirements be only to meet the ISA standards for instrument air, despite the system capability of delivering far dryer air.

16 Claims, 3 Drawing Sheets

HEATING CYCLE

STRIPPING CYCLE

COOLING CYCLE

ENERGY EFFICIENT DESICCANT DRYER REGENERATION SYSTEM

FIELD OF THE INVENTION

The field of this invention relates to desiccant compressed gas dryers and techniques for regenerating them.

BACKGROUND OF THE INVENTION

Many industrial processes require the supply of air for operation of control components. The Instrument Society of America (ISA) requires that the dew point of instrument air be kept below the coldest anticipated ambient air temperature so as to avoid condensation in the instrument air lines. Many installations set dew point limits far lower than those required by ISA for a variety of reasons. However, in many installations the level of dryness of the delivered compressed air is well below the actual system requirements.

To remove moisture from compressed air a plurality of towers are used. Each tower has a desiccant material and one tower is on line while another tower regenerates. Regeneration is periodically required because a tower becomes saturated with moisture and the dew point of the exiting air rises toward a preset set point. When this occurs, the spent tower in taken off line for regeneration and another tower that has concluded the regeneration cycle is put on line. The process is typically controlled automatically. The regeneration of a spent tower proceeds in three steps: heating, stripping, and cooling.

In the heating step, the exhaust gas directly from the compressor is directed into the tower, generally in the opposite direction as the air to be dried is normally fed in. The heat of compression from the compressor exhaust is used to drive the moisture off the desiccant. The exhaust air from the heating phase is run through a cooler and a separator to knock most of the water out before the gas is directed into the dryer that is on line for removal of the remaining moisture to the point that the desired dew point is achieved.

The heating cycle is normally done on a time basis or by sensing the gas outlet temperature from the tower being heated. When the controller senses that heating is complete, it shifts the valves so that the stripping cycle can begin. In the stripping cycle, some of the air dried from the tower that is on line is directed to the other tower, after the pressure is first reduced to nearly atmospheric. This stripping flow is cooled dried air, which helps to cool the desiccant bed and to remove any residual moisture from the tower after the heating cycle. The stripping stream is typically vented through a muffler. The stripping flow is typically 1–5% of the compressed gas flow. The purging of this much gas has a related energy cost of compression. Additionally, the compressor system may be running close to capacity and may not be able to meet system needs if 5% of the volume is vented for any significant time. While the stripping helps to reduce the dew point of the gas that will flow through the tower after regeneration is complete, it may do so well beyond the needs of many systems. Therein lies a potential to avoid energy waste if the regeneration performance is adapted to meet the system needs. This energy savings is the focus of the present invention. While past efforts to improve dryer performance have focused on the stripping step, they have addressed the situation where the compressor discharge temperature is low. With low compressor discharge temperatures, the regeneration of the dryer is not as effective and the desired dew point may not be achieved. To counter this problem, U.S. Pat. No. 6,375,722 provides a booster heater to heat only the stripping flow to compensate for the anemic heating cycle using low temperatures at the compressor discharge. The use of the stripping heater adds to energy cost. Again this system will produce air at dew points well below those required for most applications for instrument air. This reference does not address how to optimize the regeneration of a dryer so that over-drying of the air is avoided in order to save energy.

The last step in the regeneration sequence is the cooling cycle. Here, a slipstream of dried air from the tower that is on line is run into the tower being regenerated to cool it slowly. The cooling air rejoins the main airflow at the outlet of the drier that is on line to avoid the purging of any air from the system during the cooling phase. Cooling the desiccant allows the regenerated tower to go on line and produce very low dew points as desired by the system operator.

In the past, there have been unsuccessful attempts to eliminate the cycle with unacceptable fluctuations in the outlet dew point. The SP design of Henderson Engineering has this feature, which includes dew point excursions above the set point for as long as 8 minutes until the desiccant properly cools. Another design, offered as the MD dryer from Atlas Copco eliminates stripping by blending hot regeneration air with the cooler dry air from the on line tower to reduce the dew point spike. The problem with this design is that it is limited in how low a dew point can be produced and is more costly. This design lacks the flexibility that a dryer system that optimizes the stripping steps to meet system demands can achieve. Finally, heatless drying involves regeneration by a purge stream of dried air of approximately 15% of the gas compressed and dried at the time. It is not energy efficient due to the cost involved in compressing the volume that is purged to get the necessary drying.

Other U.S. Pat. Nos. that relate to the area of controlling and regenerating gas dryers are: 6,171,377; 6,221,130 and 5,632,802.

The present invention allows operation in an efficiency mode when air meeting ISA instrument air specification is called for. The system allows for high performance operation, when needed, to produce lower discharge dew points to meet the system requirements. The stripping cycle is reduced or eliminated depending on several parameters such as but not limited to: dew point required, the actual dew point, compressor discharge pressure, compressor discharge temperature, regeneration temperature, desiccant temperature, and ambient temperature. These and other aspects of the present invention will be readily apparent to those skilled in the art from a review of the detailed description of the preferred embodiment and the claims, which appear below.

SUMMARY OF THE INVENTION

A method to control the performance of desiccant dryers is disclosed that senses multiple variables and optimizes the regeneration cycle to deliver the gas at the desired dew point. The length of the stripping step is reduced or eliminated depending on the desired set point and the operating conditions of the compression system. The control system has the capability to adjust its mode of operation to meet new dew point requirements should the dew point set point be changed. The savings come from not purging as much or any gas during stripping should the system requirements be only to meet the ISA standards for instrument air, despite the system capability of delivering far dryer air.

DETAILED DESCRIPTION OF THE PREFERRED EMBODIMENT

Figure 1:
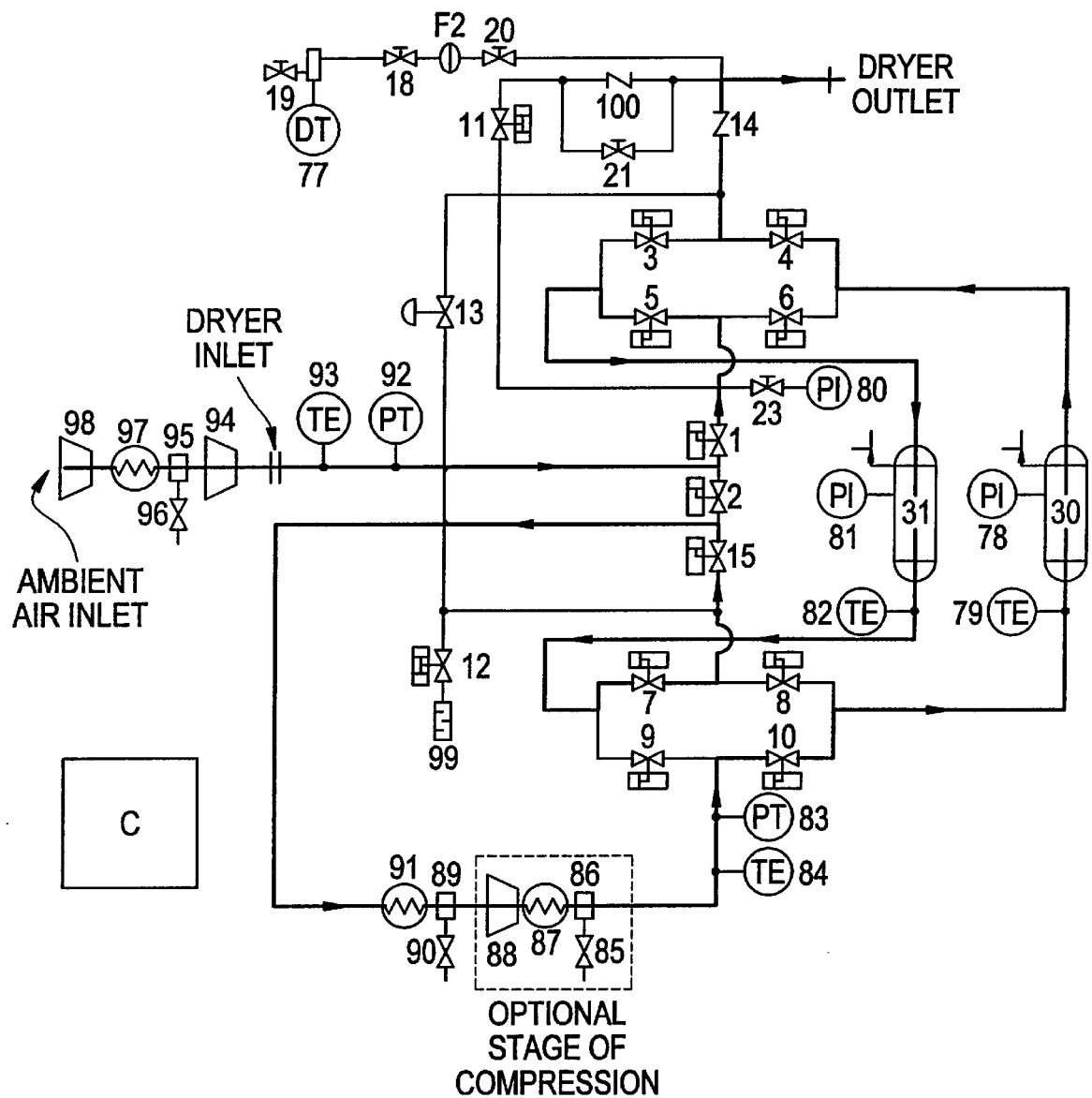
FIG. 1 is a process instrument diagram of a drying system with one tower being heated.

FIG. 1 illustrates a typical system for providing dry air. In the position of FIG. 1 the dryer 31 is in the heating cycle. Ambient air enters the first compression stage 98. It is then cooled in cooler 97 and the moisture that collects in separator 95 is removed through valve 96. Gas then enters the second stage 94. Optionally, a third stage 88 can be used, as will be described later. The present invention can be employed with any number of stages, however. The exiting gas from the second stage 94 passes by a temperature element 93 and pressure transmitter 92 so that pressure and temperature can be communicated to the controller C for cycle optimization. Gas then flows through valve 1, valve 5, and into the top of tower 31. The gas laden with moisture exits tower 31 at the bottom where its temperature is measured by temperature element 82 and that measurement is communicated to the controller C. Flow proceeds through valves 7 and 15 into cooler 91 and separator 89. Optionally, the gas can be compressed again in another stage 88 then cooled in cooler 87 and moisture separated in separator 86 and removed through valve 85. The temperature is sensed at temperature element 84 and the pressure is sensed at transmitter 83 for communication to controller C. Flow goes into tower 30 through valve 10. Its temperature is sensed at temperature element 79 before entry into tower 30. Thereafter, the gas leaves the dryer assembly through valve 4 and check valve 14. A dew point transmitter 77 is connected to the dryer outlet line to transmit the dew point of the gas to the controller C.

Figure 2:
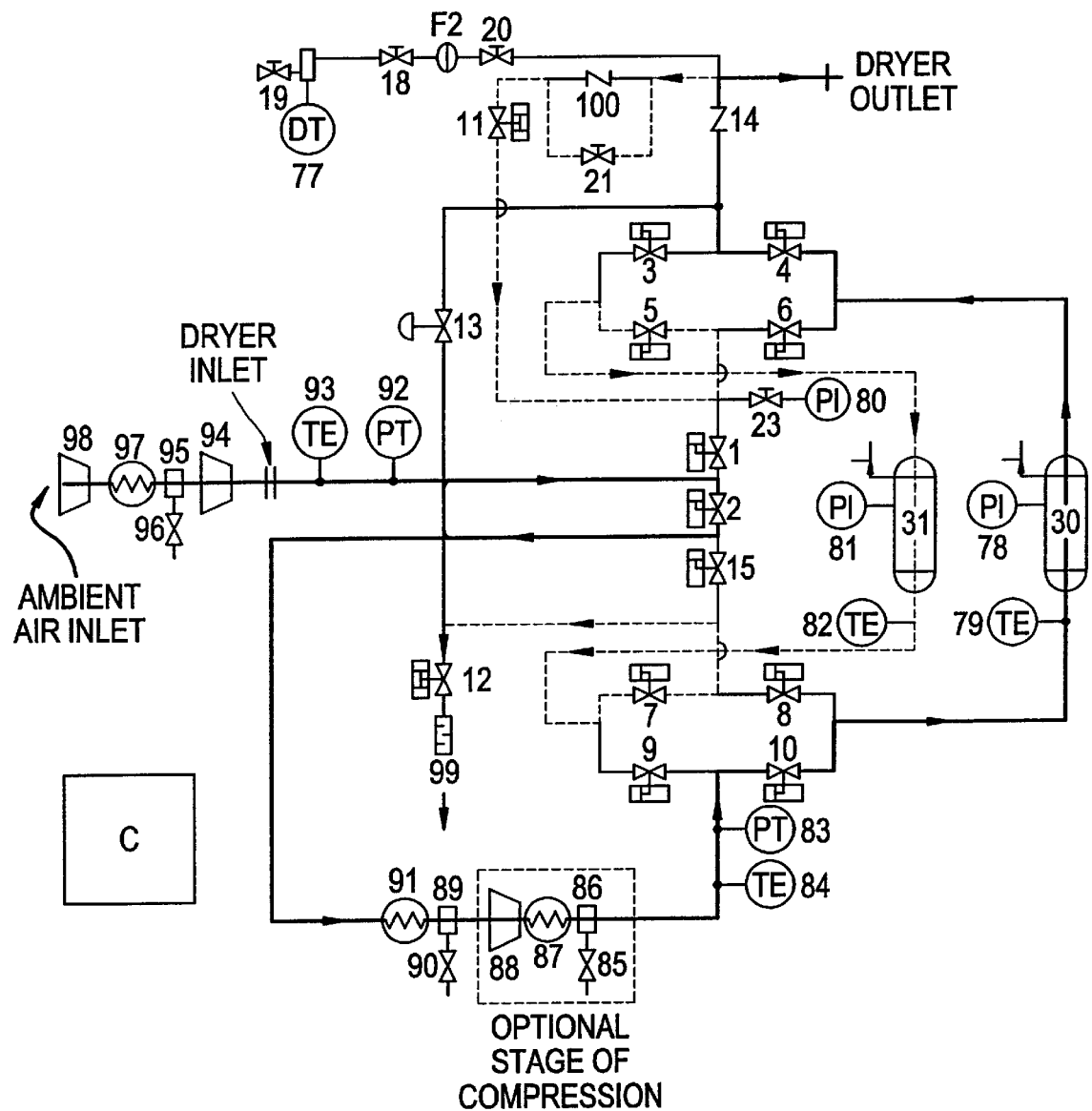
FIG. 2 is the diagram of FIG. 1 with one tower in the stripping mode.

FIG. 2 shows a stripping cycle. Now the flow does not go through valve 1 which is closed but instead, after second stage compression at 94, goes through valve 2 to cooler 91. The entire flow goes through tower 30 through valve 10. After tower 30 the bulk of the flow goes through valve 4 and check valve 14. At this time, valve 11 is open allowing a portion of the dried air flow to pass through orifice 21 which is piped in parallel with a check valve 100 so as to direct the dried air flow through orifice 21. After passing valve 11, the stripping gas flow goes through valve 5 and into the top of the tower 31. From there its temperature is measured at thermocouple 82 and it is directed through valve 7 then valve 12 into a muffler 99 for atmospheric venting.

Figure 3:
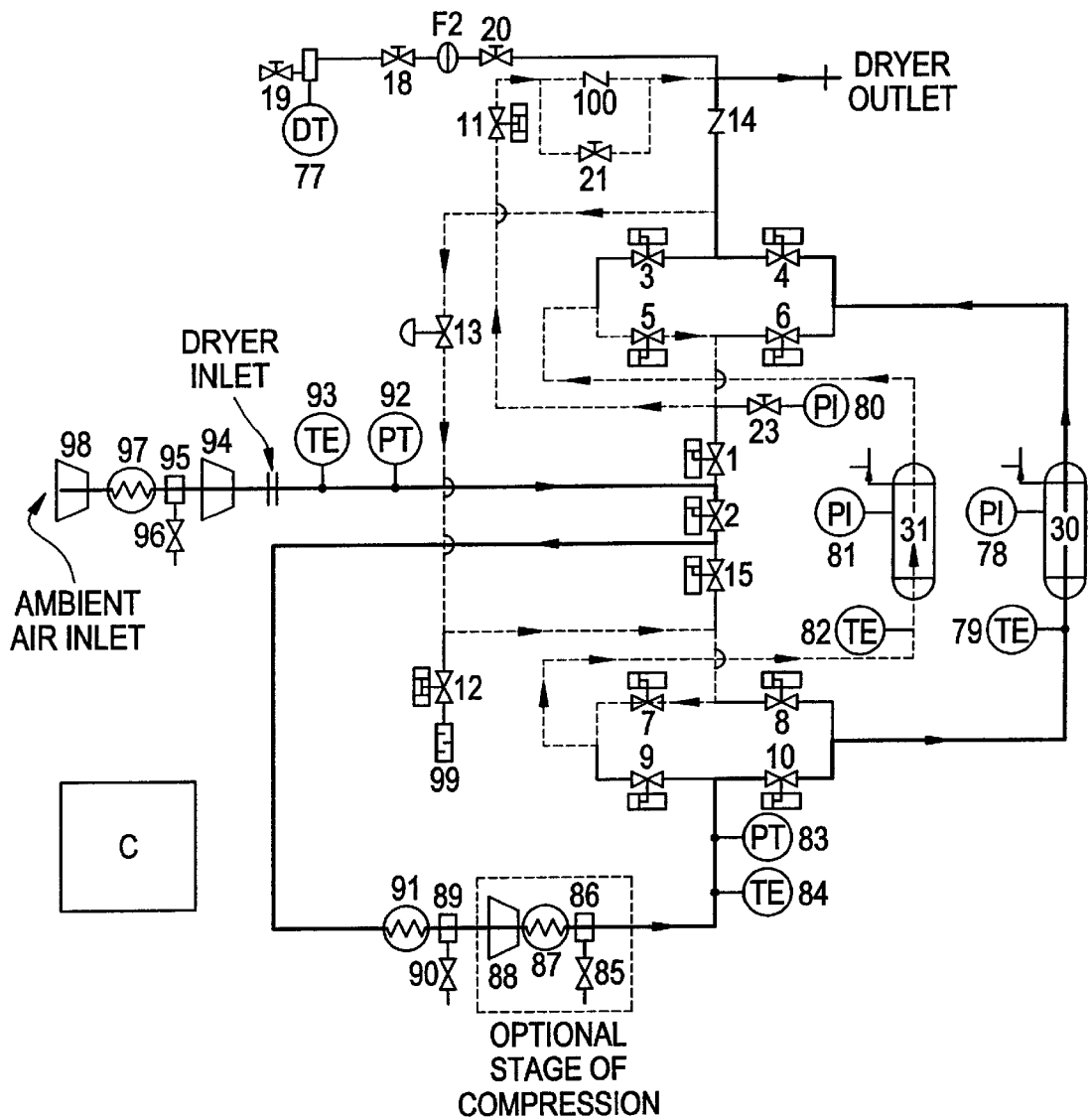
FIG. 3 is the view of FIG. 2 with one tower in the cooling mode.

FIG. 3 illustrates the cooling cycle. Here valves 2 and 10 are opened to direct gas from compression stages 98 and 94 through cooler 91 and separator 89 into tower 30. From there, the flow is through valve 4, after which there is a split. Because valves 13 and 7 are open, some of the flow goes into the bottom of tower 31 and out through valves 5 and 11 then through the check valve 100 to the dryer outlet. Valve 13 regulates the cooling flow to ensure the system parameters continue to be met during this cooling cycle.

The present invention seeks to save energy by matching the system capabilities to the system demand. For example, plant air systems are frequently specified for 40 degrees Fahrenheit dew points. However the requirements for instrument air set by the ISA is only that the dew point not exceed ambient temperature. Running a system that can produce very low dew points drier than the users actually require by ISA standards results in a waste of energy. The waste is most noticeable in the stripping operation where energy costs are expended to compress the approximately 5% of total flow, that in the past was vented during such a step. The present invention, using several measure parameters and controller C, seeks to optimize energy consumption by reducing or eliminating the stripping step if the system requirements for the users is ISA standard of the dew point being lower than ambient. In essence, the regeneration procedure is detuned to allow the dew point delivered to climb within limits when conditions permit using air that is not quite as dry as the system can optimally deliver. The control system C has the capability to switch between an economy mode of operation to save energy and an efficiency mode of operation to maintain a lower dew point, when system users demand that level of dryness.

To allow efficient operation in the economy mode where the stripping cycle is minimized or eliminated, several parameters can be monitored and the information relayed to the control system C. For example, the inlet temperature to the dryers can be monitored. As that temperature decreases, the moisture content of the air decreases. In turn, less energy in the heating and stripping cycle needs to be consumed to produce a given dew point. Of course, a warmer inlet temperature has the opposite effect. Similarly, an increase in the inlet pressure means a decrease in the moisture content of the inlet gas to the dryers with the effect of reducing the energy required to heat and strip the desiccant. Another measured variable is the regeneration temperature for the heating cycle. If this temperature is higher, more moisture is driven off and a lower dew point is obtained when putting the regenerated tower back on line. Additionally, the desiccant lasts longer because more moisture has been removed from it during heating. In the same manner, the desiccant temperature at the exit of the tower being regenerated, affects performance similarly to higher regeneration temperature. Finally the set dew point affects the regeneration operation. To work in the economy mode, the ambient temperature is sensed and the dew point is reset to within the desired range of degrees below the ambient temperature. On cold days more opportunities arise for economy operation. Similarly on low consumption days the inlet temperature to the dryers will be reduced and the pressure may increase. This also promotes minimizing or eliminating the stripping cycle and shortening the heating cycle in favor of a longer cooling cycle. Since there is no purging in the heating or cooling cycles varying their length has minimal, if any, energy consumption ramifications.

The heating step length can be made a function of several parameters. For example, the regeneration temperature and adsorbent temperature can be used. The cycle time can also be a comparison to the previous heat time and the relation of the actual to the set dew point. The heating cycle can also be subject to a maximum time. The stripping cycle and whether it is run can be a function of desiccant temperature during the drying cycle and during heating, dryer inlet temperature and pressure during drying, duration of the previous heating cycle and the set point for the dew point. The cooling cycle can be directly related to the length of the heating cycle, or the length of the stripping cycle (if any), or a comparison between the actual and the desired dew point. Operating data can be obtained from a specific installation and such historical information can be used by the control system C to optimize the drying system operation for minimization of energy consumption. The ability to run the compressed air system more efficiently by minimizing purging during stripping is the source of potential energy savings. The ability of altering the delivered dew point temperature of the dried gas allows delivery of air to ISA specifications as a baseline of performance, with an opportunity to improve regeneration efficiency to get lower dew points should the end users require it. Altering between economy mode of operation and high performance mode of operation with lower dew points can be made manually or automatically by the control system C. The control system C can use the previous cycle adjustments and the response of the outlet dew point as feedback in making subsequent regeneration cycle adjustments. Similarly, the duration of a prior step in a given regeneration cycle can be used to affect the duration of remaining steps in that cycle.

The foregoing disclosure and description of the invention are illustrative and explanatory thereof, and various changes in the size, shape and materials, as well as in the details of the illustrated construction, may be made without departing from the spirit of the invention.

We claim:

1. A control system for a compressed gas delivery system to deliver a desired dew point having a compressor and a dryer system periodically regenerated by at least two of the steps of heating, stripping and cooling, comprising:

a dew point transmitter to sense the exit dew point from the dryer system and to transmit a signal;

a controller to receive said dew point signal and to control the regeneration of the dryer system in two distinct modes, an economy mode where the delivered dew point is higher and less energy is consumed in the regeneration and an efficiency mode where a lower dew point is obtained while using more energy in the regeneration than in said economy mode.

2. The control system of claim 1, wherein:

said dew point in said economy mode is within the required specification for the compressed gas for the connected end users.

3. The control system of claim 2, wherein:

said controller, in said economy mode, adjusts the duration of the stripping step to a smaller value than that used for the stripping step in said efficiency mode.

4. The control system of claim 3, wherein:

said controller eliminates the stripping step in said economy mode.

5. The control system of claim 3, wherein:

said controller lengthens the heating and cooling steps when reducing the duration of the stripping step in said efficiency mode.

6. The control system of claim 3, wherein:

said controller compares the effects of previous changes to the steps in said economy mode as feedback for adjustment of future changes to those steps to hold a desired dew point.

7. The control system of claim 3, wherein:

said controller in a given regeneration sequence senses the duration of the previous step or steps in that sequence to affect the duration of a subsequent step in that regeneration sequence.

8. The control system of claim 3, wherein:

said controller senses the temperature of the gas available for heating.

9. The control system of claim 3, wherein:

said controller senses the temperature of the absorbent material in the dryer system.

10. The control system of claim 9, wherein:

said controller senses the temperature of the absorbent material in the dryer at the end of the heating step.

11. The control system of claim 3, wherein:

said controller senses the gas temperature at the inlet to the dryer system.

12. The control system of claim 3, wherein:

said controller senses the gas pressure at the inlet to the dryer system.

13. The control system of claim 2, wherein:

said controller reduces the duration of the heating step in said economy mode as compared to said efficiency mode.

14. The control system of claim 13, wherein:

said controller extends the duration of the cooling step in said economy mode as compared to said efficiency mode.

15. The control system of claim 2, wherein:

said gas comprises air and the delivered dew point in said economy mode meets the instrument air standard of ISA.

16. The control system of claim 1, wherein:

said controller automatically switches between said modes to maintain a required dew point.

* * * * *